US012455770B2

(12) United States Patent
Harwood et al.

(10) Patent No.: US 12,455,770 B2
(45) Date of Patent: Oct. 28, 2025

(54) RESOURCE-CAPABILITY-AND-CONNECTIVITY-BASED WORKLOAD PERFORMANCE IMPROVEMENT SYSTEM

(71) Applicant: Dell Products L.P., Round Rock, TX (US)

(72) Inventors: John Harwood, Boston, MA (US); John Cardente, Milford, MA (US); Gaurav Chawla, Austin, TX (US); William Price Dawkins, Lakeway, TX (US); Stuart Allen Berke, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 498 days.

(21) Appl. No.: 18/152,533

(22) Filed: Jan. 10, 2023

(65) Prior Publication Data

US 2024/0231912 A1    Jul. 11, 2024

(51) Int. Cl.
*G06F 9/50* (2006.01)

(52) U.S. Cl.
CPC ............ *G06F 9/5016* (2013.01); *G06F 9/505* (2013.01)

(58) Field of Classification Search
CPC .................................................... G06F 9/5016
See application file for complete search history.

(56) References Cited

U.S. PATENT DOCUMENTS

2019/0087745 A1*  3/2019  Kurian ................... G06N 20/00
2021/0144081 A1   5/2021  Palermo et al.
2023/0359511 A1* 11/2023  Wang ...................... G06F 9/505

* cited by examiner

*Primary Examiner* — Charlie Sun
(74) *Attorney, Agent, or Firm* — Joseph Mencher

(57) ABSTRACT

A resource-capability-and-connectivity-based workload performance improvement system includes a resource management device coupled to processing systems and memory systems. The resource management device receives a request to perform a first workload, identifies a DAG that includes functions for performing the first workload, and uses first parameters in the DAG to configure the processing systems and the memory subsystems to perform the functions. Based on performance of the functions, the resource management device determines function modification(s) for at least one of the functions and, based on the function modification(s), modifies the first parameters included in the DAG to provide modified parameters. When the resource management device receives a request to perform a second workload, it identifies the DAG that includes the functions for performing the second workload, and uses the modified parameters in the DAG to configure the processing systems and the memory subsystems to perform the functions.

20 Claims, 16 Drawing Sheets

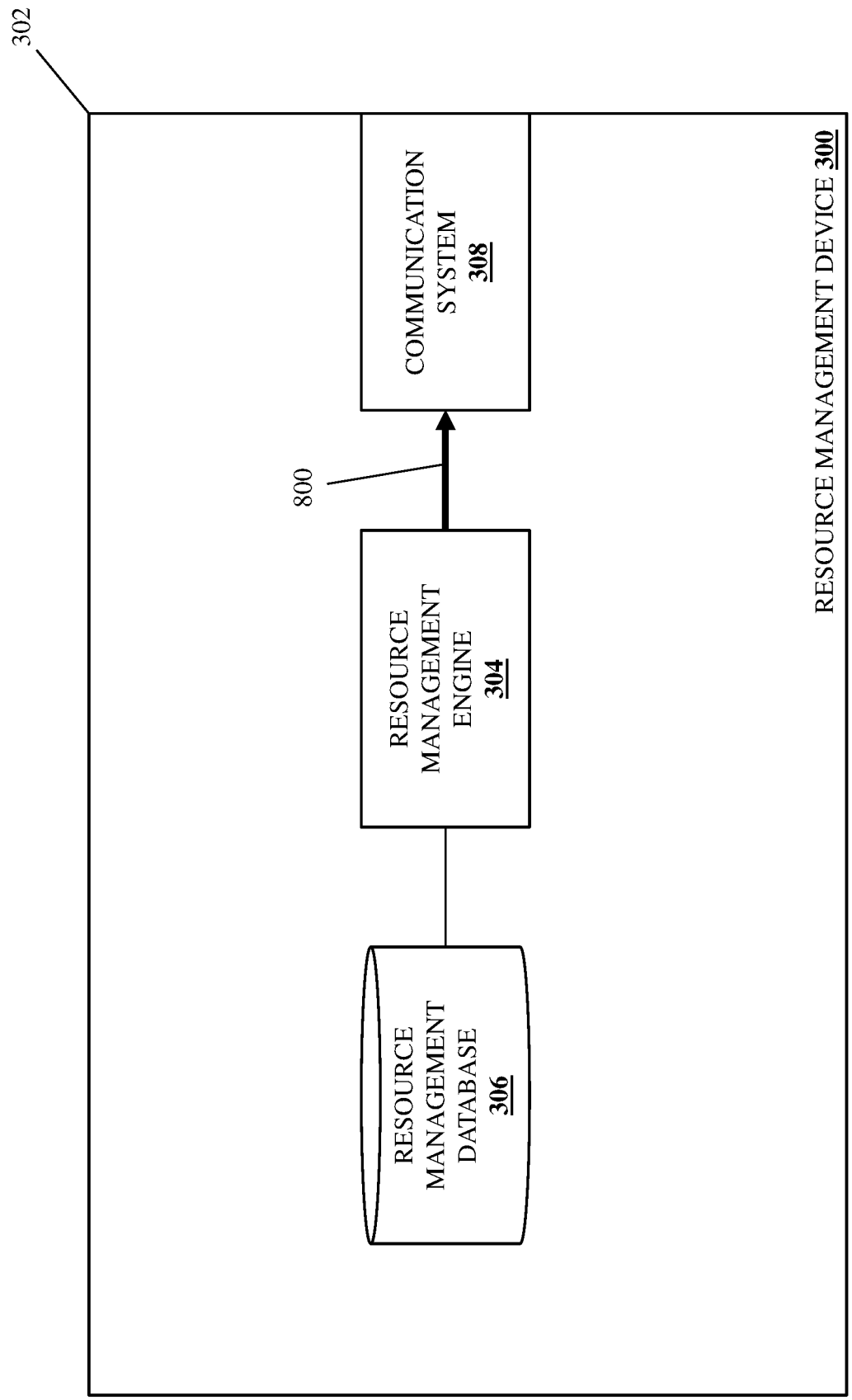

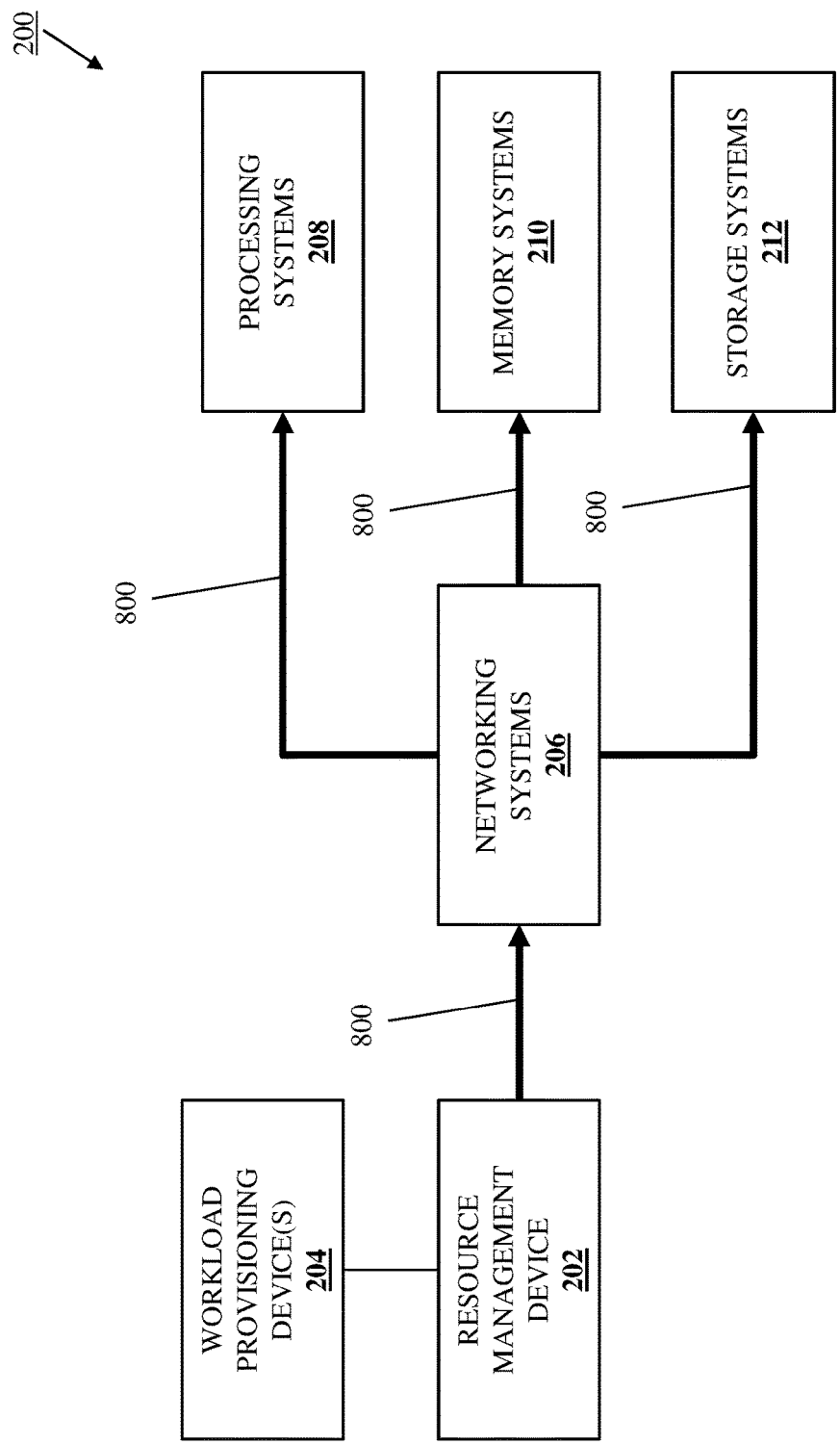

RESOURCE-CAPABILITY-AND-CONNECTIVITY-BASED WORKLOAD PERFORMANCE IMPROVEMENT SYSTEM

BACKGROUND

The present disclosure relates generally to information handling systems, and more particularly to improving the performance of workloads based on the capabilities and connectivity of resources provided in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as server devices, desktop computing devices, laptop/notebook computing devices, tablet computing devices, mobile phones, and/or other computing devices often require the performance of workloads. Some conventional workload performance systems may include a processing fabric of distributed processing systems that utilize a memory fabric of distributed memory systems to perform the workload, which can raise some issues. For example, such memory fabrics may provide their memory systems in different memory "tiers" (e.g., a relatively high performance memory tier, one or more relatively intermediate memory tier, and a relatively low performance memory tier) that may include different types of memory devices that may have different memory characteristics/capabilities including persistence characteristics, latency characteristics, durability characteristics, processing capabilities, cache capabilities, capacity capabilities, endurance capabilities, and/or other memory characteristics/capabilities known in the art. Furthermore, the processing systems and memory systems may be connected in a variety of manners that can influence memory tier behavior in a manner that is not deterministic. The inventors of the present disclosure have discovered that the memory tier characteristics/capabilities and processing system/memory system connectivity discussed above can affect the ability of the processing system and memory systems discussed above to satisfy workload requirements, and is not taken into account by conventional workload performance systems.

Accordingly, it would be desirable to provide a workload performance system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a resource management engine that is configured to: receive a first workload request to perform a first workload; identify a first Directed Acyclic Graph (DAG) that includes a plurality of functions for performing the first workload; configure, using first parameters included in the first DAG, a plurality of processing systems and a plurality of memory subsystems to perform the plurality of functions; determine, based on performance of the plurality of functions by the plurality of processing systems and the plurality of memory subsystems, at least one function modification for at least one of the plurality of functions; modify, based on the at least one function modification, the first parameters included in the first DAG to provide modified parameters; receive a second workload request to perform a second workload; identify the first DAG that includes the plurality of functions for performing the second workload; and configure, using the modified parameters included in the first DAG, the plurality of processing systems and the plurality of memory subsystems to perform the plurality of functions.

BRIEF DESCRIPTION OF THE DRAWINGS

FIG. 8A is a schematic view illustrating an embodiment of the resource management device of FIG. 3 operating during the method of FIG. 4.

FIG. 8B is a schematic view illustrating an embodiment of the resource-capability-and-connectivity-based workload performance system of FIG. 2 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
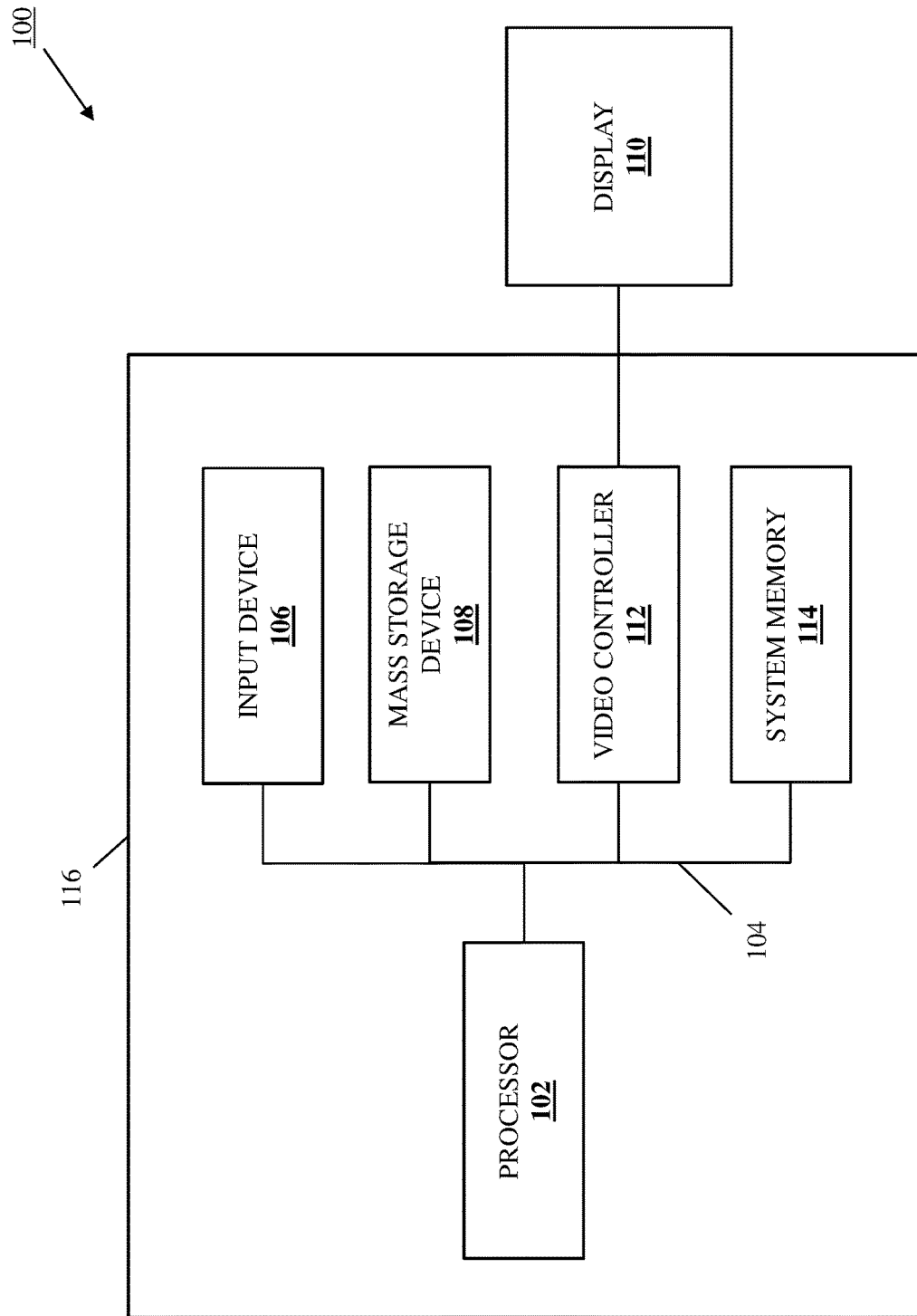
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
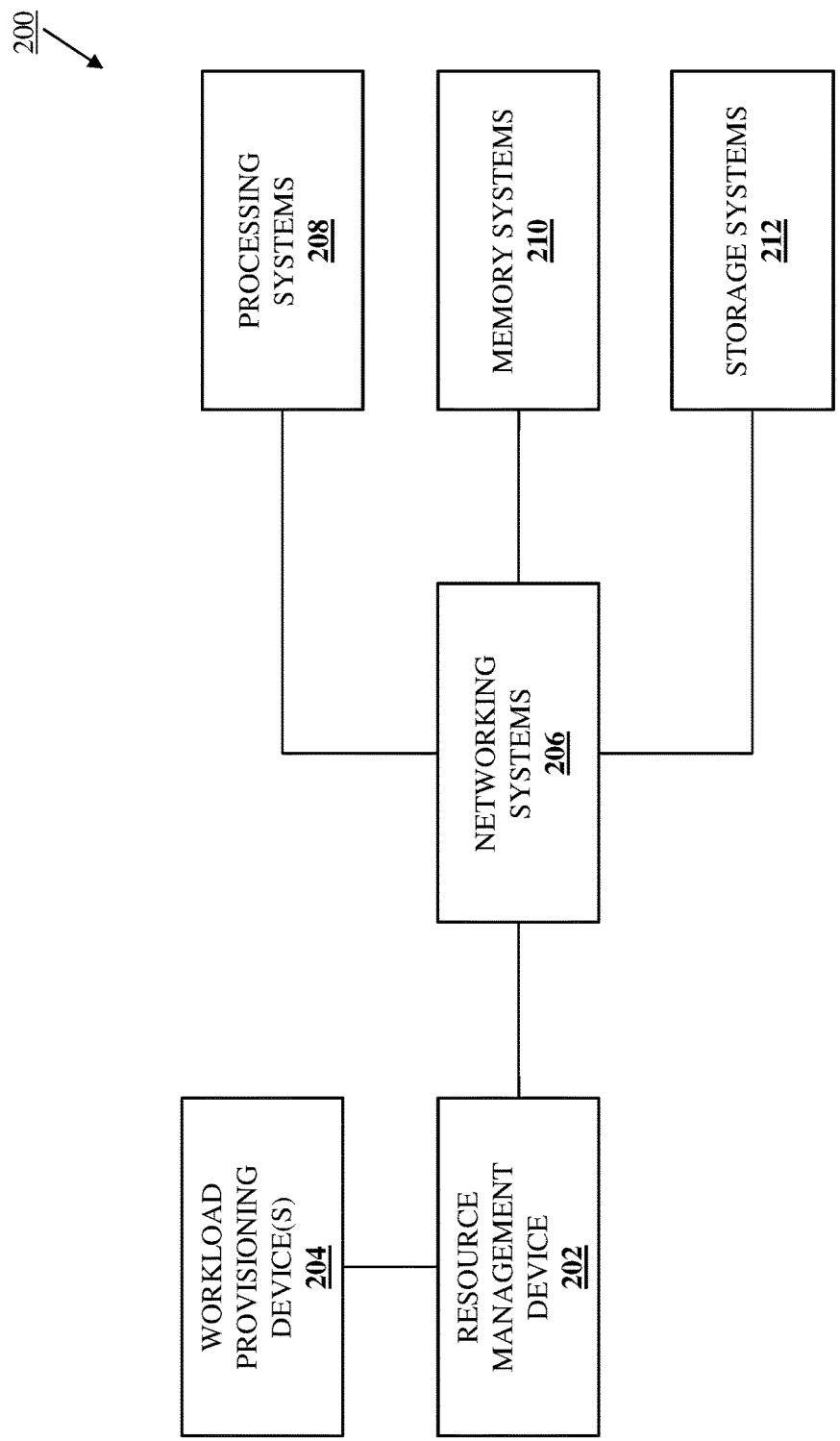
FIG. 2 is a schematic view illustrating an embodiment of a resource-capability-and-connectivity-based workload performance system.

Referring now to FIG. 2, an embodiment of a resource-capability-and-connectivity-based workload performance system 200 is illustrated that may be provided according to the teachings of the present disclosure. In the illustrated embodiment, the resource-capability-and-connectivity-based workload performance system 200 includes a resource management device 202 that may operate to perform the resource management functionality described below. In an embodiment, the resource management device 202 may be provided by the IHS 100 discussed above with reference to FIG. 1, and/or may include some or all of the components of the IHS 100, and in specific examples may be provided by a server device. However, while illustrated and discussed as being provided by a server device, one of skill in the art in possession of the present disclosure will recognize that resource management devices provided in the resource-capability-and-connectivity-based workload performance system 200 may include any devices that may be configured to operate similarly as the resource management device 202 discussed below.

In the illustrated embodiment, the resource-capability-and-connectivity-based workload performance system 200 includes one or more workload provisioning devices 204 that are coupled to the resource management device 202, and while the workload provisioning device(s) 204 are illustrated as being directly coupled to the resource management device 202, one of skill in the art in possession of the present disclosure will appreciate how the workload provisioning device(s) 204 may be coupled to the resource management device 202 via a network (e.g., a Local Area Network (LAN), the Internet, combinations thereof, and/or other networks known in the art) while remaining within the scope of the present disclosure as well. In an embodiment, the workload provisioning device(s) 204 may be provided by the IHS 100 discussed above with reference to FIG. 1, and/or may include some or all of the components of the IHS 100, and in specific examples may be provided by server devices, desktop computing devices, laptop/notebook computing devices, tablet computing devices, mobile phones, and/or other computing devices that one of skill in the art in possession of the present disclosure would appreciate are configured to request the performance of the workloads discussed below. However, while illustrated and discussed as being provided by particular computing devices, one of skill in the art in possession of the present disclosure will recognize that workload provisioning devices provided in the resource-capability-and-connectivity-based workload performance system 200 may include any devices that may be configured to operate similarly as the workload provisioning device(s) 204 discussed below.

In the illustrated embodiment, the resource management device 202 is coupled to a plurality of networking systems 206 that provides a network including a processing fabric, a memory fabric, and a storage fabric, and one of skill in the art in possession of the present disclosure will appreciate how that network may be provided using a LAN, the Internet, combinations thereof, and/or any of a variety of networks that one of skill in the art in possession of the present disclosure will recognize as allowing the functionality described below. For example, the networking systems 206 may include Ethernet networking systems, Infiniband networking systems, Compute eXpress Link (CXL) networking systems, NVLink networking systems, 5G networking systems, satellite networking systems, and/or other networking systems that would be apparent to one of skill in the art in possession of the present disclosure. As discussed below, the processing fabric, memory fabric, and storage fabric may provide a variety of resources connected to each other in a variety of manners across a variety of locations in a manner that allow the distributed performance of the workloads described below.

For example, the resource management device 202 may be coupled via the networking systems 206 to a processing fabric that, in the examples illustrated and discussed below, is provided by a plurality of processing systems 208 that may be included in server devices or other computing systems known in the art, and that may be provided by homogenous or heterogenous processor technologies. As described below, the processing systems 208 that provide the processing fabric may be provided by different types of processing systems such as Central Processing Unit (CPU) processing systems, Graphics Processing Unit (GPU) processing systems, Field Programmable Gate Array (FPGA) processing systems, Data Processing Unit (DPU) processing systems, Network Interface Controller (NIC) processing systems or other packet processors, Application Specific Integrated Circuit (ASIC) processing systems, other hardware accelerator processing systems, and/or other types of processing systems that would be apparent to one of skill in the art in possession of the present disclosure would appreciate may be utilized to perform workloads.

The resource management device 202 may also be coupled via the networking systems 206 to a memory fabric that, in the examples illustrated and discussed below, is provided by a plurality of memory systems 210 that may be included in server devices or other computing systems known in the art, and that may be provided by homogenous or heterogenous memory technologies. As described below, the memory systems 210 that provide the memory fabric may be provided by different types of memory systems such as CPU-accessible memory systems, GPU-accessible memory systems, FPGA-accessible memory systems, DPU-accessible memory systems, NIC-accessible memory systems or other packet-processor-accessible memory systems, ASIC-accessible memory systems, computational memory systems, other hardware-accelerator-accessible memory systems, and/or other types of memory systems that would be apparent to one of skill in the art in possession of the present disclosure would appreciate may be utilized by processing systems to perform workloads. As discussed below, the memory systems 210 may be configured to provide a shared memory fabric for the processing systems 208 such that each memory system 210 appears as a "local" memory system to each of the processing systems 208, with memory system access enabled via Remote Direct Memory Access (RDMA) operations and/or other memory system access techniques that would be apparent to one of skill in the art in possession of the present disclosure.

In an embodiment, any of the memory systems 210 may be "proximate" to any of the processing systems 208 based on, for example, the processing of data stored in that memory system by its proximate processing system being relatively more efficient than the processing of that data stored in that memory system by the other processing systems due to, for example, that proximity resulting in relatively faster access to that data that in turn allows relatively faster processing of that data and/or faster transfers of that data over a network (e.g., with a time needed to access data measured in terms of the time required to receive the first byte of data, the last byte of data, and/or using other data access time measurement techniques that one of skill in the art in possession of the present disclosure would recognize as taking into account data access delays cause by the number of network segments traversed, network bandwidth, network physical media, network protocols, network contention, network reliability, and/or other data access delays known in the art), and/or based on any other memory system/processing system proximity factors that would be apparent to one of skill in the art in possession of the present disclosure.

In a specific example, "proximity" between a memory system and a processing system may be defined in terms of network latency that may be measured based on "hops", network fabric type, and/or using other latency metrics that would be apparent to one of skill in the art in possession of the present disclosure. For example, the number of hops in a topology between a memory system and a processing system may be limited to a threshold number of hops in order to be "proximate". In another example, "proximity" may be defined by the enablement of relatively higher performance networking between a memory system and a processing system (e.g., relatively higher speed CXL networking systems vs. relatively lower speed Ethernet networking systems), with the memory system or other "data landing zone" transformed in some embodiments into a memory space to enable memory-to-memory data transfers for peer-to-peer communications (while eliminating an external network).

The resource management device 202 may also be coupled via the networking systems 206 to a storage fabric that, in the examples illustrated and discussed below, is provided by a plurality of storage systems 212. As described below, the storage systems 212 that provide the storage fabric may be provided by different types of storage systems such as CPU-accessible storage systems, GPU-accessible storage systems, FPGA-accessible storage systems, DPU-accessible storage systems, NIC-accessible storage systems or other packet-processor-accessible storage systems, ASIC-accessible storage systems, other hardware-accelerator-accessible storage systems, and/or other types of storage systems that would be apparent to one of skill in the art in possession of the present disclosure would appreciate may be utilized by processing systems to perform workloads. However, while a specific resource-capability-and-connectivity-based workload performance system 200 has been illustrated and described, one of skill in the art in possession of the present disclosure will appreciate how the resource-capability-and-connectivity-based workload performance system of the present disclosure may include a variety of components and/or component configurations while remaining within the scope of the present disclosure as well.

Figure 3:
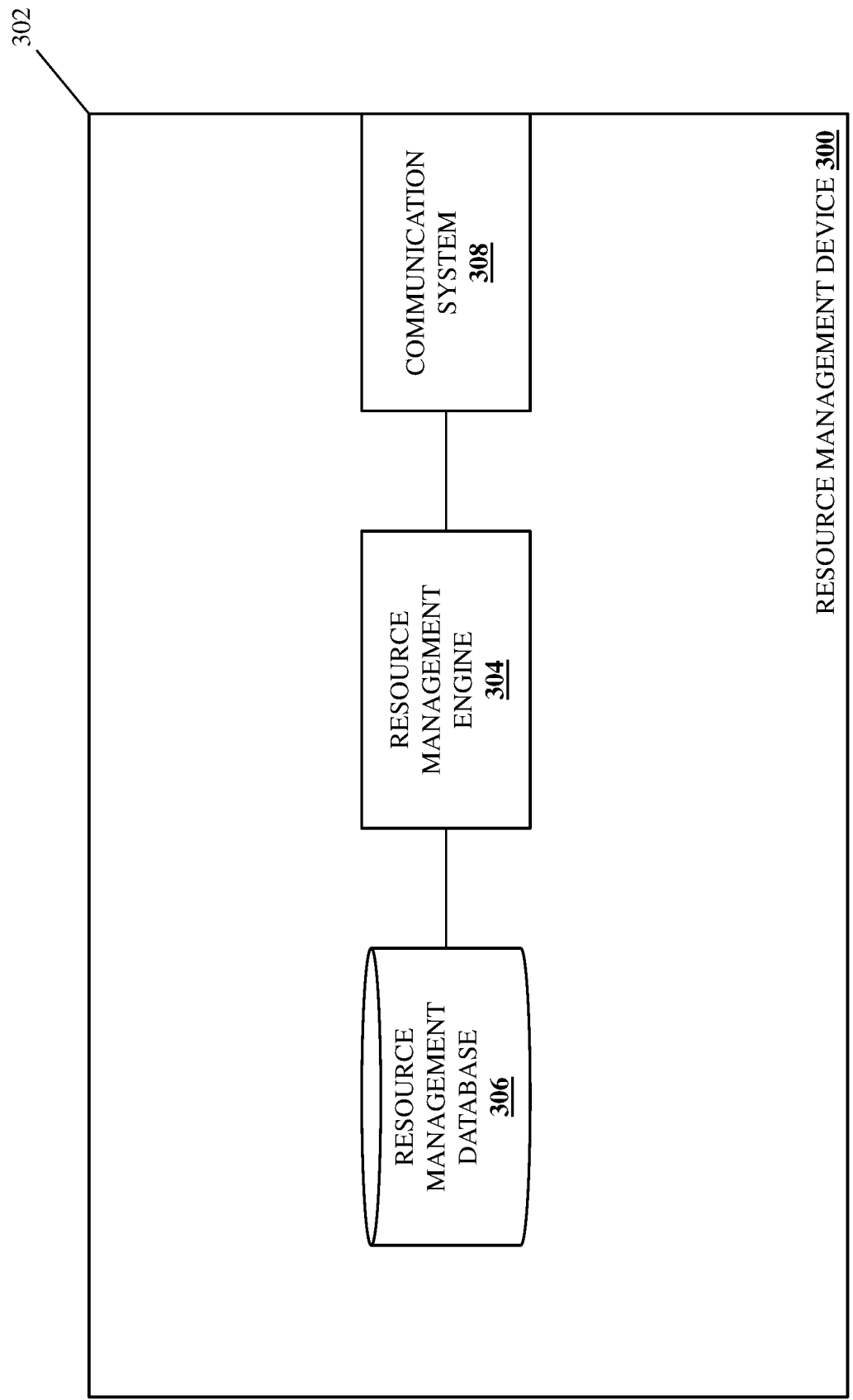
FIG. 3 is a schematic view illustrating an embodiment of a resource management device that may be included in the resource-capability-and-connectivity-based workload performance system of FIG. 2.

Referring now to FIG. 3, an embodiment of a resource management device 300 is illustrated that may provide the resource management device 202 discussed above with reference to FIG. 2. As such, the resource management device 300 may be provided by the IHS 100 discussed above with reference to FIG. 1 and/or may include some or all of the components of the IHS 100, and in specific examples may be provided by a service device. Furthermore, while illustrated and discussed as being provided by a server device, one of skill in the art in possession of the present disclosure will recognize that the functionality of the resource management device 300 discussed below may be provided by other devices that are configured to operate similarly as the resource management device 202 discussed below. In the illustrated embodiment, the resource management device 300 includes a chassis 302 that houses the components of the resource orchestrator device 300, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a resource management engine 304 that is configured to perform the functionality of the resource management engines and/or resource management devices discussed below.

The chassis 302 may also house a storage system (not illustrated, but which may include the storage 108 discussed above with reference to FIG. 1) that is coupled to the resource management engine 304 (e.g., via a coupling between the storage system and the processing system) and that includes a resource management database 306 that is configured to store any of the information utilized by the resource management engine 304 discussed below. The chassis 302 may also house a communication system 308 that is coupled to the resource orchestrator engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific resource management device 300 has been illustrated and described, one of skill in the art in possession of the present disclosure will recognize that resource management devices (or other devices operating according to the teachings of the present disclosure in a manner similar to that described below for the resource management device 300) may include a variety of components and/or component configurations for providing conventional functionality, as well as the functionality discussed below, while remaining within the scope of the present disclosure as well.

Figure 4:
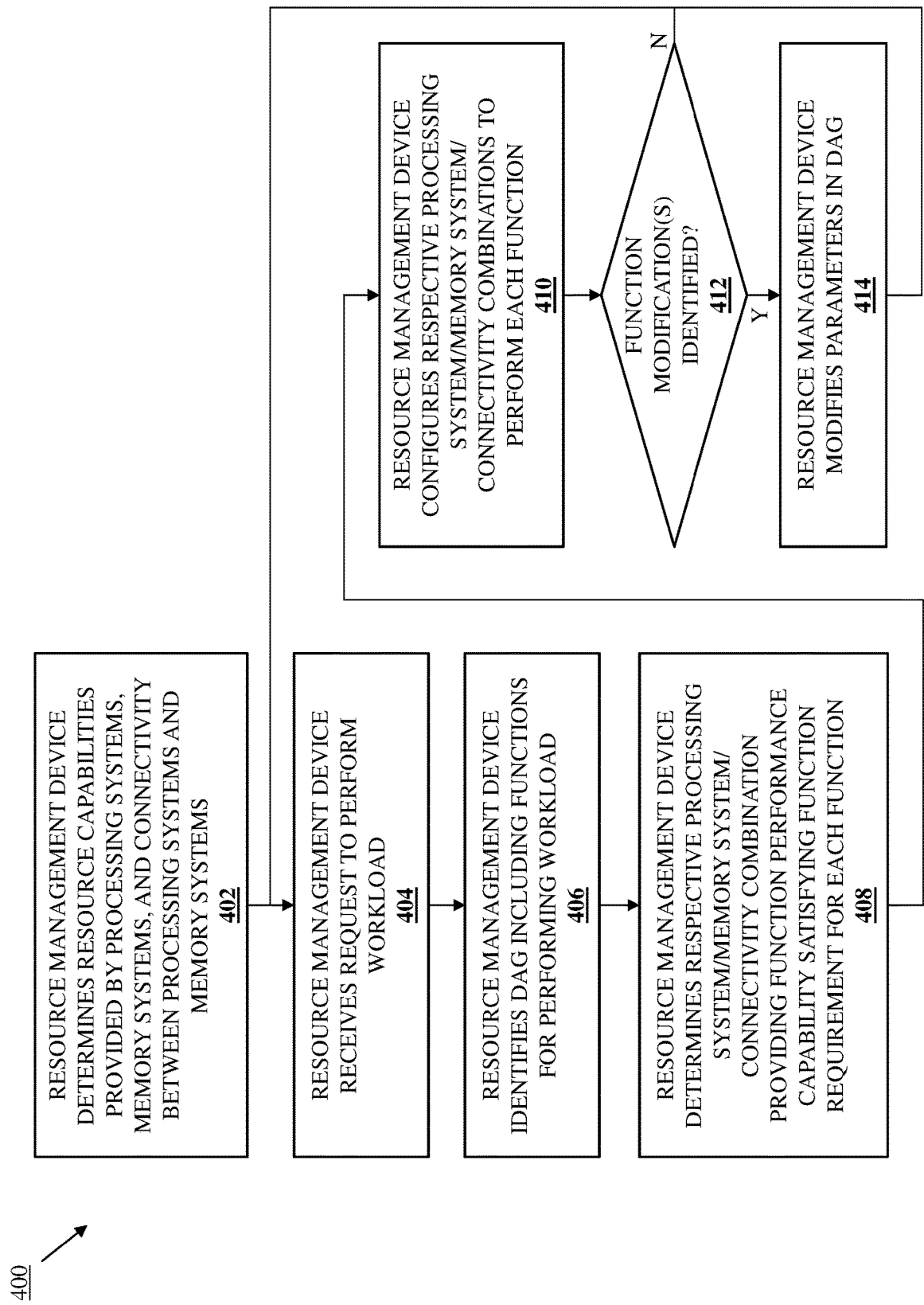
FIG. 4 is a flow chart illustrating an embodiment of a method for performing workloads based on resource capabilities and connectivity.

Referring now to FIG. 4, an embodiment of a method 400 for performing workloads based on resource capabilities and connectivity is illustrated. As discussed below, the systems and methods of the present disclosure provide for performance of workloads based on the capabilities and connectivity of resources, while also operating to provide for the improvement of such workload performance. For example, the resource-capability-and-connectivity-based workload performance system of the present disclosure may include a resource management system that is coupled to a plurality of processing systems and a plurality of memory systems. The resource management system determines resource capabilities provided by each of the plurality of processing systems, each of the plurality of memory systems, and connectivity between the plurality of processing systems and the plurality of memory systems. When the resource management system receives a workload request to perform a first workload, it identifies a first Directed Acyclic Graph (DAG) that includes a plurality of functions for performing the first workload and, for each of the plurality of functions, determines a processing system/memory system/connectivity combination based on the resource capabilities that provides a function performance capability that satisfies a function requirement for that function, and configures that respective processing system/memory system/connectivity combination to perform that function. As such, the performance of workloads is improved relative to conventional workload performance systems.

Figure 5A:
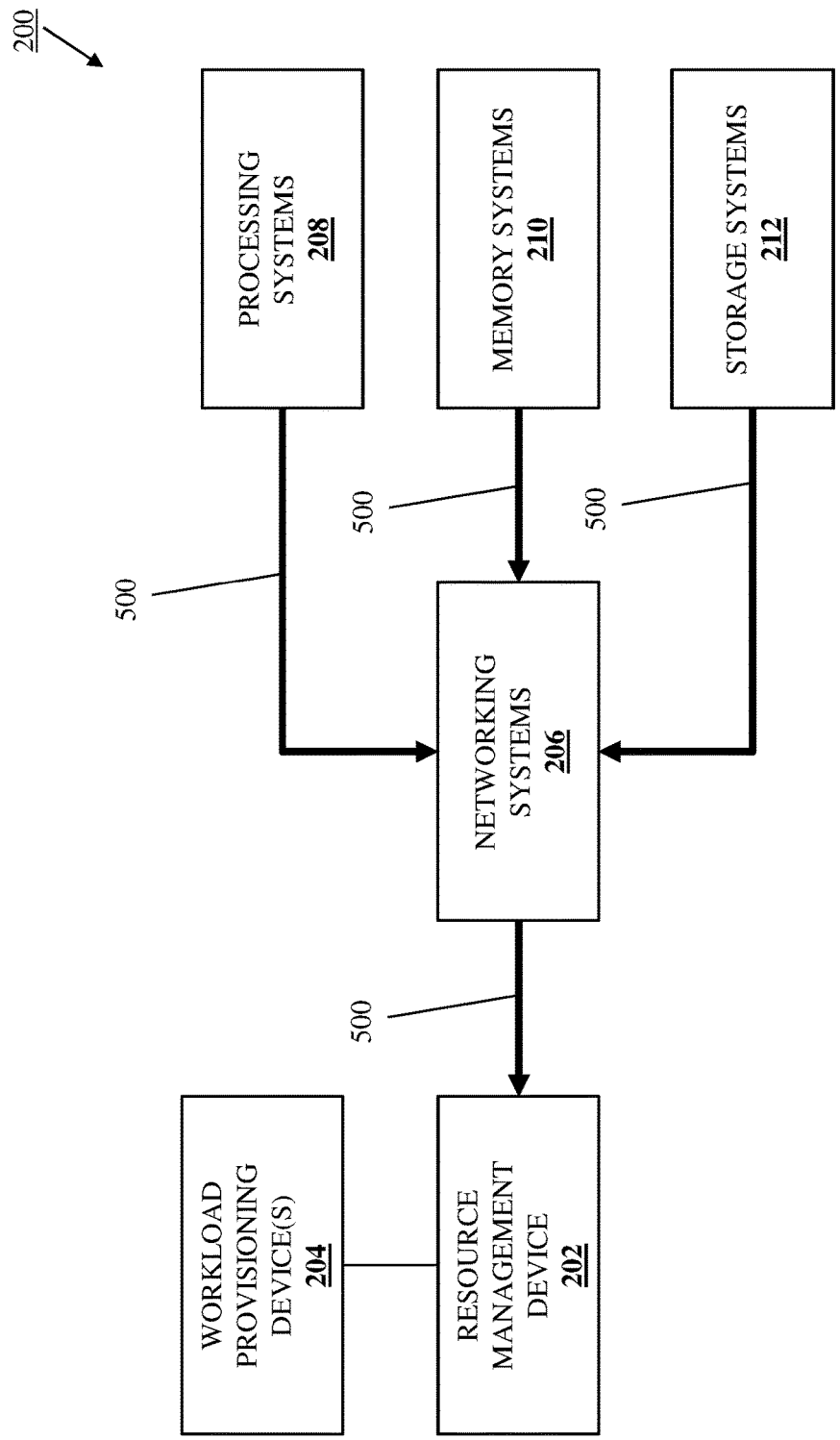
FIG. 5A is a schematic view illustrating an embodiment of the resource-capability-and-connectivity-based workload performance system of FIG. 2 operating during the method of FIG. 4.
Figure 5B:
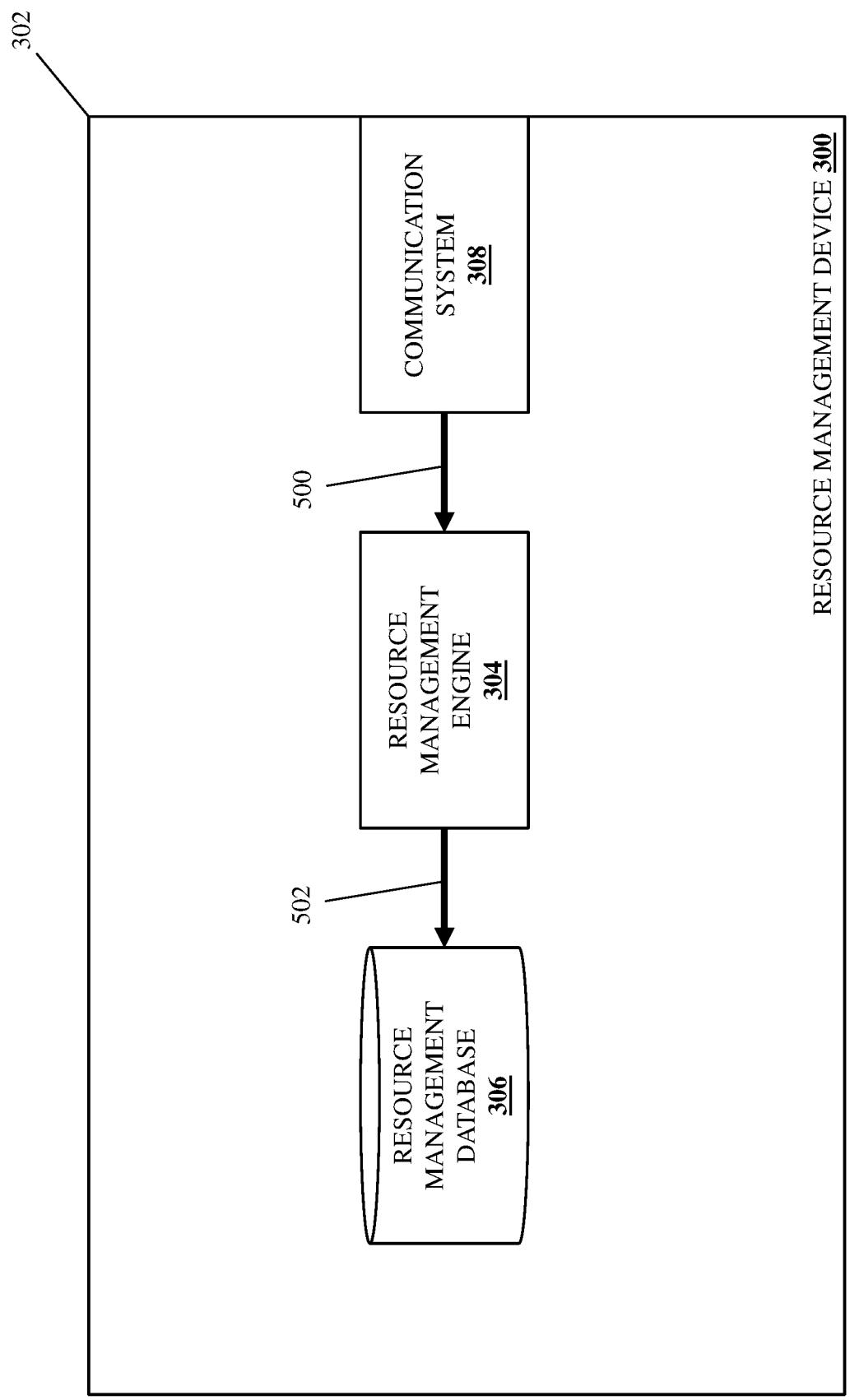
FIG. 5B is a schematic view illustrating an embodiment of the resource management device of FIG. 3 operating during the method of FIG. 4.

The method 400 begins at block 402 where a resource management device determines resource capabilities provided by processing systems, memory systems, and connectivity between processing systems and memory systems. With reference to FIGS. 5A and 5B, in an embodiment of block 402, the resource management engine 304 in the resource management device 202/300 may perform resource capability determination operations 500 that may include determining, via its communication system 308, resource capabilities of the processing systems 208, resource capabilities of the memory systems 210, and resource capabilities of the connectivity between the processing systems 208 and the memory systems 210 that may be provided by connections or couplings between the processing systems 208 and the memory systems 210, some of which may be provided by the networking systems 206. As such, the resource capability determination operations 500 may also include determining, via its communication system 308, resource capabilities of the networking systems 206 as well. Furthermore, while not described in detail below, the resource capability determination operations 500 that may also include determining, via its communication system 308, resource capabilities of the storage systems 212. The resource management engine 304 may then perform resource capability storage operations 502 that include storing the resource capabilities determined at block 402 in the resource management database 306. As will be appreciated by one of skill in the art in possession of the present disclosure, while the resource capability determination operations 500 and the resource capability storage operations 502 are illustrated and described as being performed once during the method 400 at block 402, the resource capabilities discussed above may be determined periodically and at any time during the method 400 while remaining within the scope of the present disclosure as well.

In a specific example, at block 402, the resource management engine 304 in the resource management device 202/300 may use processing, memory, storage, and networking Application Programming Interfaces (APIs) to discover each node (e.g., each server device or other computing device, networking device, storage system, etc.) that is coupled to the network 206 and that includes the processing systems 208, memory systems 210, storage systems 212, and networking systems 206. As such, one of skill in the art in possession of the present disclosure will appreciate how such APIs may allow for the discovery of each of the processing systems 208, each of the memory systems 210, and the connectivity between the plurality of processing systems 208 and the plurality of memory systems 210 at block 402. Furthermore, one of skill in the art in possession of the present disclosure will appreciate how the node discovery at block 402 may include the device-level discovery of device resource capabilities discussed above, as well as rack-level discovery of rack resource capabilities, pod-level discovery of pod resource capabilities, datacenter-level discovery of datacenter resource capabilities, and/or the discovery of resource capabilities at different levels of granularity that will fall within the scope of the present disclosure as well.

In an embodiment, the resource capabilities provided by the processing systems 208 may include capabilities provided by different types of processing systems such as, for example, CPU processing systems, GPU processing systems, FPGA processing systems, DPU processing systems, NIC processing systems or other packet processors, ASIC processing systems, other hardware accelerator processing systems, and/or other types of processing systems that would be apparent to one of skill in the art in possession of the present disclosure would appreciate may be utilized to perform workloads. As discussed in some of the specific examples provided below, resource capabilities provided by the processing systems 208 may include the capability of the processing systems 208 to perform one or more functions such as, for example, function(s) included in microservice(s) that those processing resources are configured to perform, and/or other functions that would be apparent to one of skill in the art in possession of the present disclosure. As such, the determination of resource capabilities provided by the processing systems 208 may include the determination of functions that each processing system 208 is configured to perform, but one of skill in the art in possession of the present disclosure will appreciate how determination of the resource capabilities provided by the processing systems 208 may identify processing bandwidth, processing speed, and/or any other processing capabilities of processing resources known in the art.

Similarly, the resource capabilities provided by the memory systems 210 may include capabilities provided by different types of memory systems such as, for example, CPU-accessible memory systems, GPU-accessible memory systems, FPGA-accessible memory systems, DPU-accessible memory systems, NIC-accessible memory systems or other packet-processor-accessible memory systems, ASIC-accessible memory systems, other hardware-accelerator-accessible memory systems, and/or other types of memory systems that would be apparent to one of skill in the art in possession of the present disclosure would appreciate may be utilized by processing resources to perform workloads. As discussed in some of the specific examples provided below, the resource capabilities provided by the memory systems 210 may be identified by memory tiers in which each memory resource is included (e.g., a relatively high performance memory tier, at least one intermediate memory tier, and a relatively low performance memory tier), but one of skill in the art in possession of the present disclosure will appreciate how the resource capabilities provided by the memory systems 210 may identify memory bandwidth, memory speed, memory persistence, memory latency, memory caching, memory durability, memory capacity, memory endurance, and/or any other memory capabilities of memory resources known in the art.

Similarly, the resource capabilities provided by the storage systems 212 may include capabilities provided by different types of storage systems such as, for example, CPU-accessible storage systems, GPU-accessible storage systems, FPGA-accessible storage systems, DPU-accessible storage systems, NIC-accessible storage systems or other packet-processor-accessible storage systems, ASIC-accessible storage systems, other hardware-accelerator-accessible storage systems, and/or other types of storage systems that would be apparent to one of skill in the art in possession of the present disclosure would appreciate may be utilized by processing resources to perform workloads. As such, the resource capabilities provided by the storage systems 212 may be identified by storage tiers in which each storage resource 506 is included (e.g., a relatively high performance storage tier, at least one intermediate storage tier, and a relatively low performance storage tier), and one of skill in the art in possession of the present disclosure will appreciate how the storage capabilities provided by the storage systems 212 may identify storage bandwidth, storage speed, and/or any other storage capabilities of storage resources known in the art.

Similarly, the resource capabilities provided by the connectivity between the processing systems 208 and the memory systems 210 may be based on processing system/memory system direct connections and/or couplings via a physical networking fabric that provide the data communication path(s) between any pair of a processing systems and memory system. As such, the resource capabilities of the processing system/memory system connectivity discussed below may identify how each of the processing systems 208 and memory systems 210 are connected and/or coupled together, may be include information about the proximity of the processing systems 208 and memory systems 210 (e.g., by indicating the memory systems 210 that are directly connected to processing systems 208 as opposed to memory systems 210 that are coupled to processing systems 208 by one or more components and/or a network, indicating the memory systems 210 that are coupled to processing systems 208 by relatively high speed networking components, etc.). Furthermore, the resource capabilities provided by the connectivity between the processing systems 208 and the memory systems 210 may include the latency of such connectivity, the bandwidth of such connectivity, and/or any other connectivity capabilities that would be apparent to one of skill in the art in possession of the present disclosure.

As discussed above, the memory systems 210 may be configured as a shared memory fabric that allows each of the memory systems 210 to be accessible by each of the processing systems 208 via Remote Direct Memory Access (RDMA) operations or other remote access techniques known in the art, and thus each memory system may appear as a "local" memory resource (e.g., a directly-connected memory resource) to that processing system regardless of the physical proximity of that memory system to that processing system. As such, while each processing system 208 may be configured to access data in any of the memory systems 210 via RDMA operations in a manner similar to accessing data in local/directly connected memory systems, the resource capabilities determined for the connectivity between processing systems and memory system may identify the relative "proximity" of processing/memory system combinations and/or may otherwise identify the relative efficiency of processing system/memory system combinations.

As discussed above, processing systems and memory systems in a variety of different locations may be connected to each other in a variety of manners, and because the processing fabric/memory fabric interconnect may influence the behavior of memory systems and memory tiers in a non-deterministic manner, the determination of the resource capabilities of the connectivity between processing systems and memory systems at block 402 will allow for a determination of the capability of any processing system/memory system combination to meet the requirements of a workload. However, while determination of specific resource capabilities has been illustrated and described, one of skill in the art in possession of the present disclosure will appreciate how the processing systems, memory systems, and connectivity between the processing systems and memory systems may include other resource capabilities that may be determined while falling within the scope of the present disclosure as well.

As such, following block 402, the resource management database 310 may store information about the processing/memory/storage fabric topology provided by any of a variety of networking system types, which may identify capabilities of the processing systems 208 to process data stored in the memory systems 210 or storage systems 212, the capabilities of the memory systems 208 to store and provide access to data to the processing systems 208, as well the capabilities of the connectivity between the processing systems 208 and memory systems 210 to transmit data between each other, and one of skill in the art in possession of the present disclosure will recognize how such information may be analyzed to determine a function performance capability of any processing system/memory systems/connectivity combination to perform a function required as part of a workload.

Figure 6A:
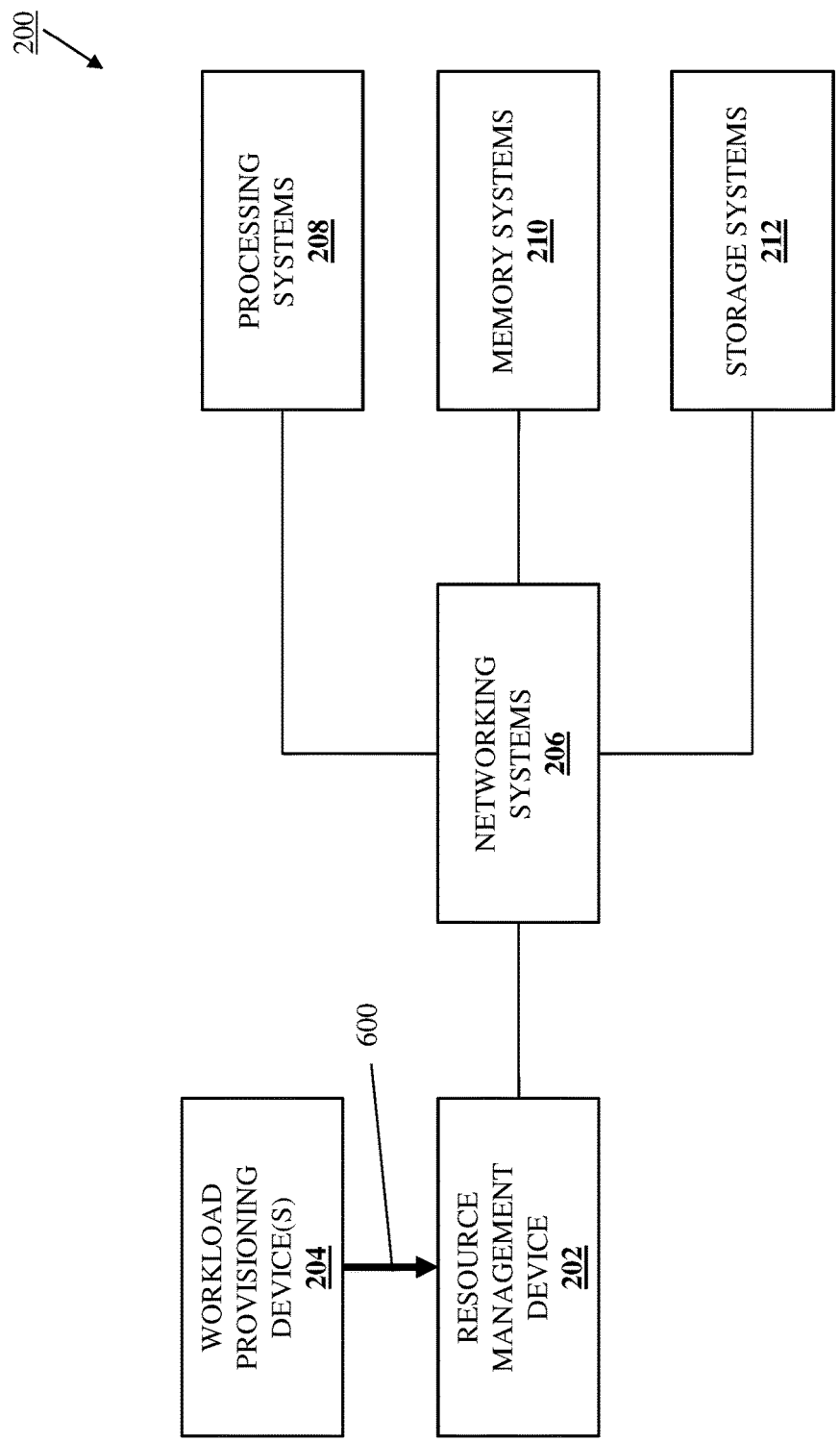
FIG. 6A is a schematic view illustrating an embodiment of the resource-capability-and-connectivity-based workload performance system of FIG. 2 operating during the method of FIG. 4.
Figure 6B:
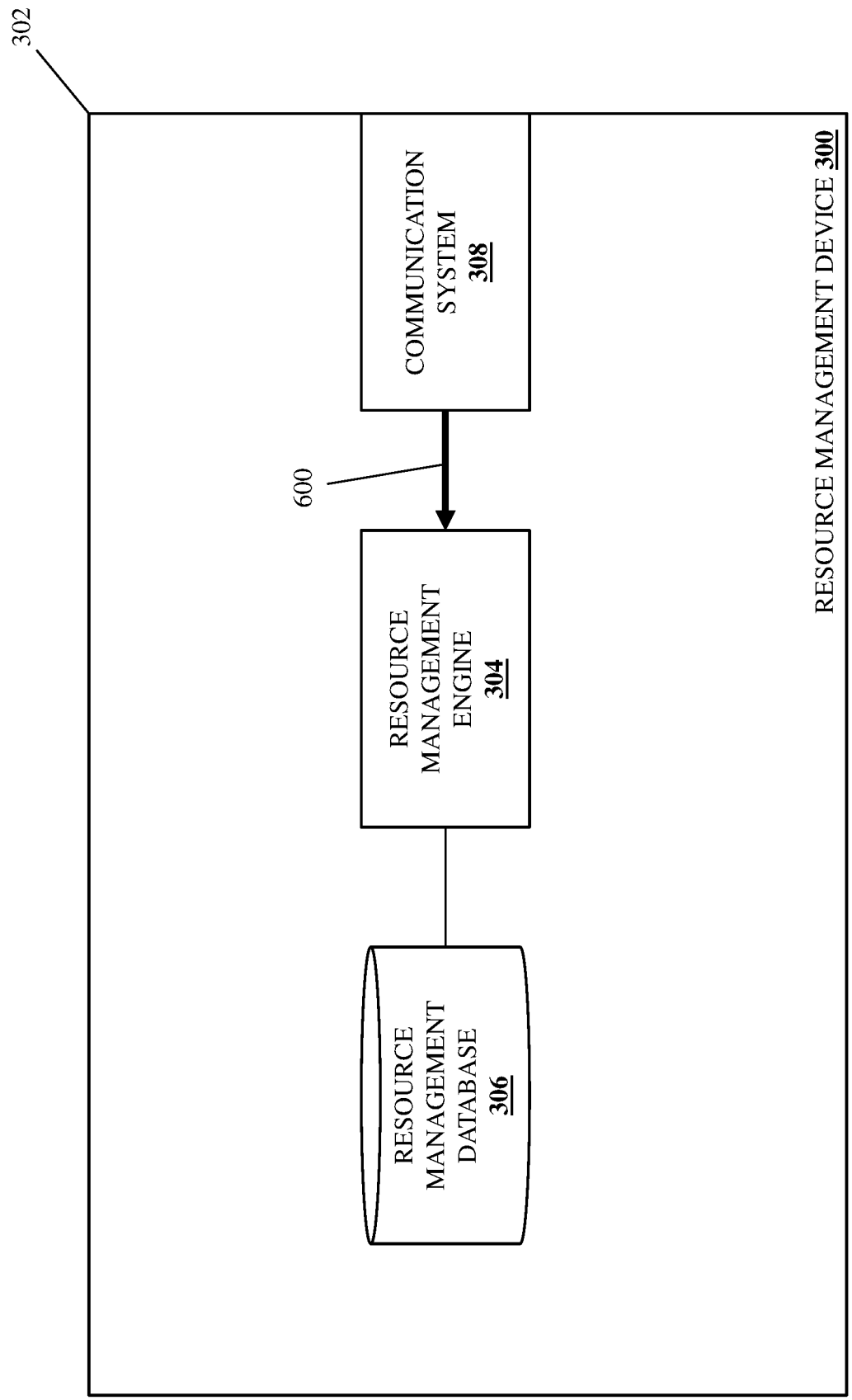
FIG. 6B is a schematic view illustrating an embodiment of the resource management device of FIG. 3 operating during the method of FIG. 4.

The method 400 then proceeds to block 404 where the resource management device receives a request to perform a workload. With reference to FIGS. 6A and 6B, in an embodiment of block 404, the workload provisioning device(s) 204 may perform workload performance request transmission operations 600 that may include transmitting a request to perform a workload to the resource management device 202/300 such that the resource management engine 304 receives that request via its communication system 308. As discussed above, the workload whose performance is requested at block 402 may require the performance of a plurality of workload operations. In some examples, each of the workload operations required to perform a workload may be identified in the request to perform the workload. In other examples, the resource management engine 304 may be configured to identify each of the workload operations required to perform a workload in response to receiving the request to perform the workload. However, while a few specific examples have been provided, one of skill in the art in possession of the present disclosure will appreciate how workload operations for performing a workload may be identified in a variety of manners that will fall within the scope of the present disclosure as well.

Figure 7A:
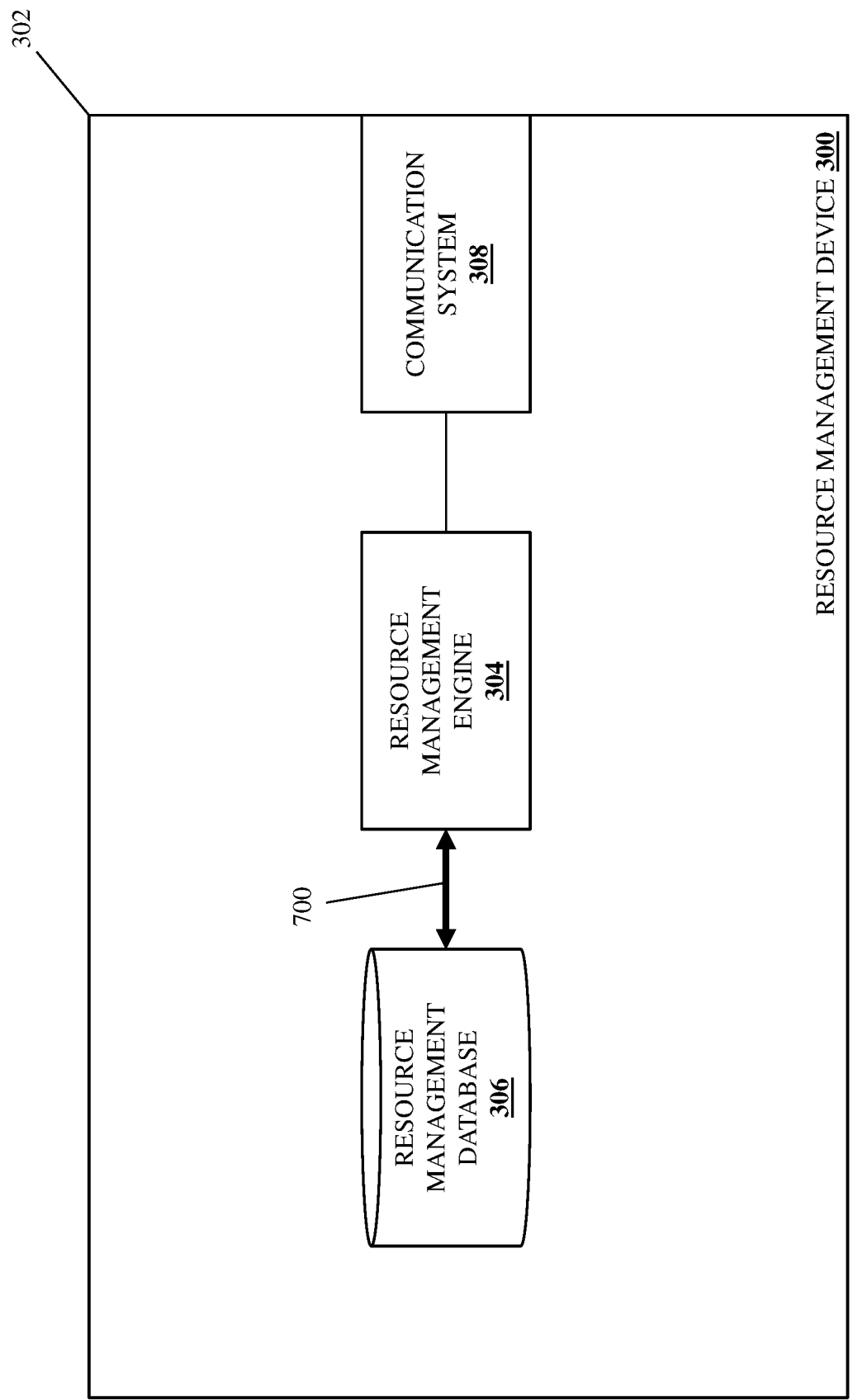
FIG. 7A is a schematic view illustrating an embodiment of the resource management device of FIG. 3 operating during the method of FIG. 4.
Figure 7B:
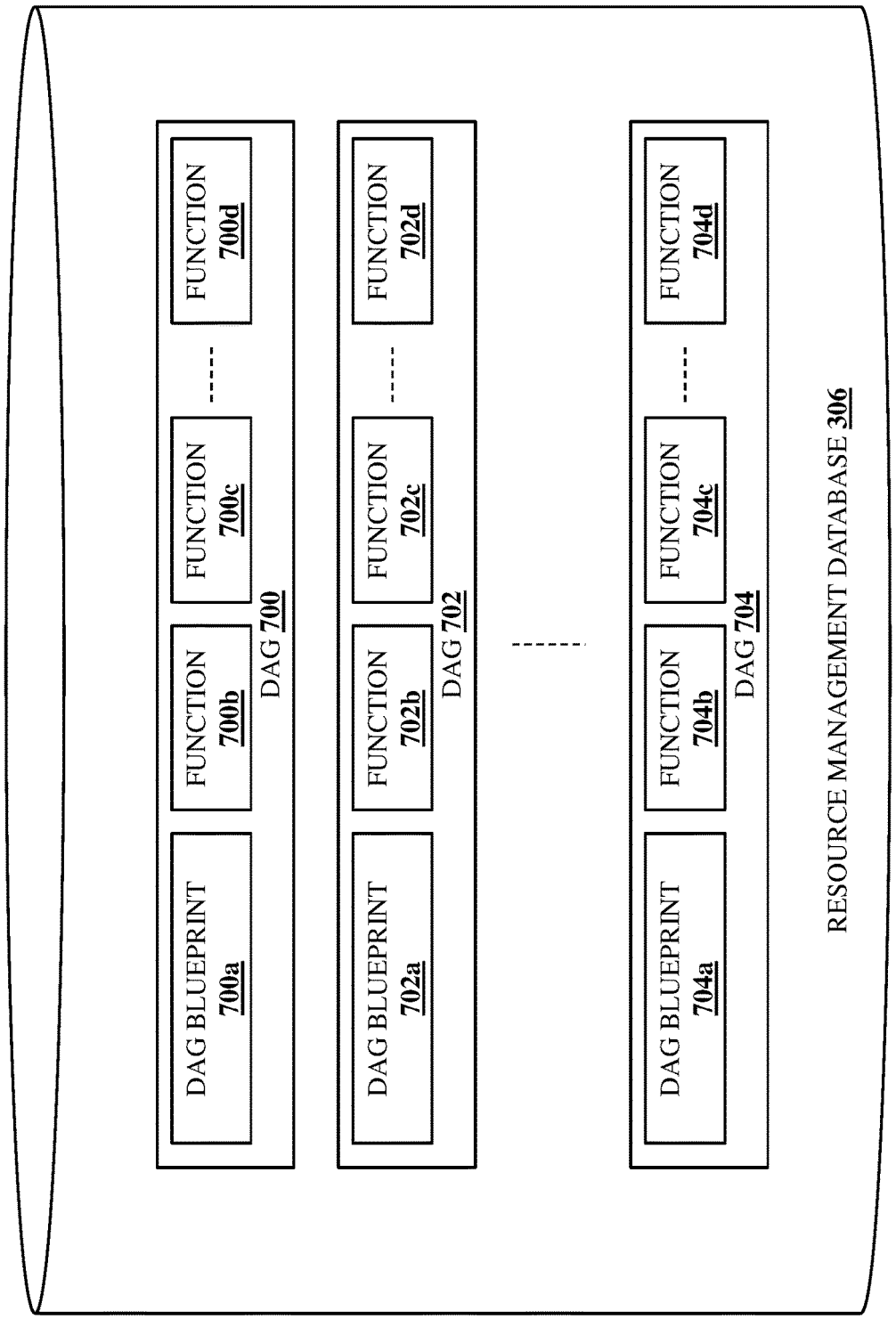
FIG. 7B is a schematic view illustrating an embodiment of DAGs that may be utilized during the method of FIG. 4.
Figure 9A:
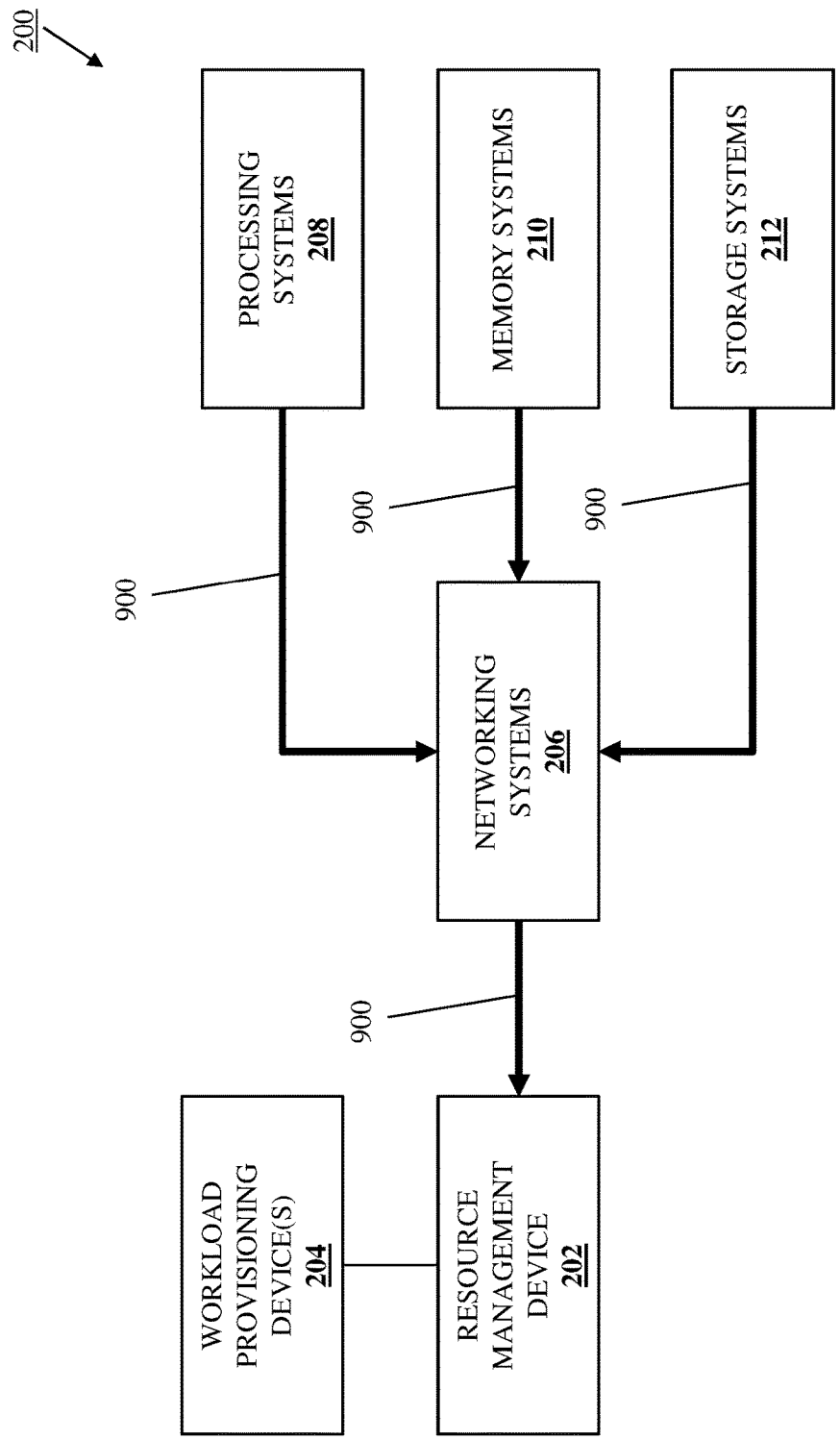
FIG. 9A is a schematic view illustrating an embodiment of the resource-capability-and-connectivity-based workload performance system of FIG. 2 operating during the method of FIG. 4.
Figure 9B:
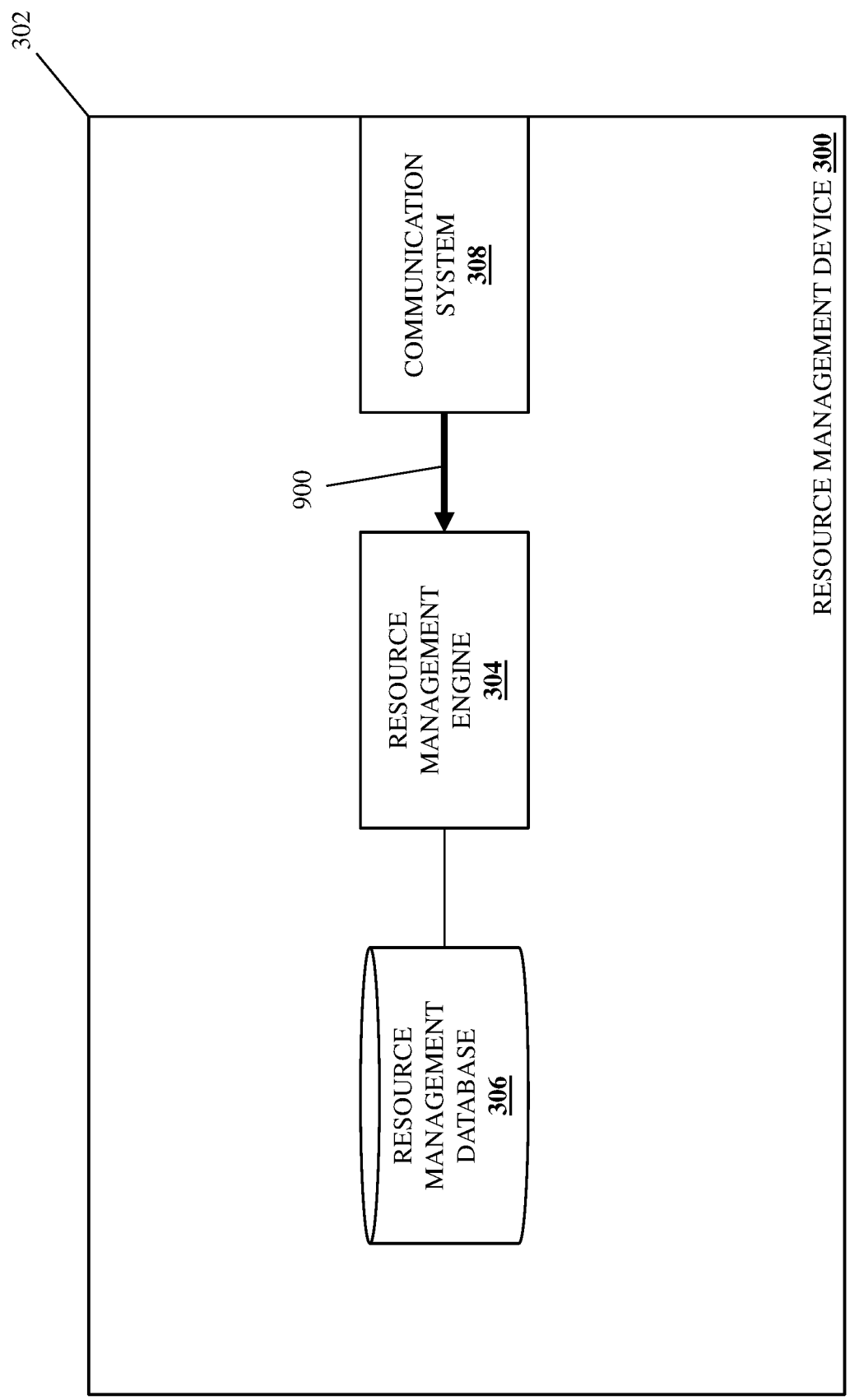
FIG. 9B is a schematic view illustrating an embodiment of the resource management device of FIG. 3 operating during the method of FIG. 4.

The method 400 then proceeds to block 406 where the resource management device identifies a DAG including functions for performing the workload. With reference to FIG. 7A, in an embodiment of block 406, the resource management engine 304 in the resource management device 202/300 may perform DAG identification operations 700 that include accessing the resource management database 306 to identify a DAG that includes functions for performing the workload requested at block 404. For example, with reference to FIG. 7B, the resource management database 306 store a plurality of DAGs 700, 702, and up to 704. As can be seen, the DAG 700 includes a DAG blueprint 700a and a plurality of functions 700b, 700c, and up to 700d; the DAG 702 includes a DAG blueprint 702a and a plurality of functions 702b, 702c, and up to 702d; and the DAG 704 includes a DAG blueprint 704a and a plurality of functions 704b, 704c, and up to 704d.

In an embodiment, the DAGs 700-704 may have been previously defined to perform respective workloads prior to receiving the workload request at block 404, and any DAG identified for use in performing a workload as per the method 400 below may have previously been defined to perform a different workload. As such, one or more of the DAGs 700-704 may be capable of performing the workload requested at block 404 based on, for example, the functions in those DAG(s) providing for the performance of the workload operations included in that workload.

In an embodiment, the DAG blueprint for each of the DAGs 700-704 may provide a "best practice" template for performing the functions included in that DAG, and thus may identify parameters for satisfying function requirements for the functions included in that DAG. To provide a specific example, the DAG blueprint for a DAG may identify storage requirements for storing data for use by one or more of the functions include in that DAG, as well as corresponding parameters for storage system(s) used to perform any of those functions. To provide another specific example, the DAG blueprint for a DAG may identify memory requirements for providing access to data for use by one or more of the functions include in that DAG, as well as corresponding parameters for memory system(s) used to perform any of those functions. To provide yet another specific example, the DAG blueprint for a DAG may identify processing requirements for processing data for use by one or more of the functions included in that DAG, as well as corresponding parameters for processing system(s) used to perform any of those functions. To provide yet another specific example, the DAG blueprint for a DAG may identify processing/memory connectivity requirements for transmitting data for use by one or more of the functions included in that DAG, as well as corresponding parameters for connectivity between processing system(s) and memory system(s) used to perform any of those functions.

As such, at block 406, the resource management engine 304 in the resource management device 202/300 may identify one of the DAGs 700, 702, and up to 704 that includes functions for performing the workload requested at block 402 in response to, for example, determining that the functions included in that DAG are configured to perform the workload operations of the workload requested at block 404. As such, the identification of the DAG at block 406 may include the identification of the DAG blueprint and functions included in that DAG. As discussed above, any of the functions and/or the DAG blueprint included in the DAG may define function requirements for performing each function included in the DAG, and parameters included in the DAG blueprint may identify function requirements such as resource type requirements to perform any function, function performance thresholds for performing any function, and/or any other function requirements that would be apparent to one of skill in the art in possession of the present disclosure.

The method 400 then proceeds to block 408 where the resource management device determines a respective processing system/memory system/connectivity combination providing a function performance capability satisfying a function requirement for each function. In an embodiment, at block 408, the resource management engine 304 in the resource management device 202/300 may determine a respective combination of at least one of the processing systems 208, at least one of the memory systems 210, and the connectivity between those processing system(s) and memory system(s) (which may be provided by one or more of the networking systems 206) that will be used to perform each function included in the DAG identified at block 406. For example, at block 408, the resource management engine 304 may determine a respective processing system/memory system/connectivity combination that provides a "best fit" (e.g., relative to any other processing system/memory system/connectivity combinations) for performing each function included in the DAG identified at block 406.

In a specific example, the resource management engine 304 in the resource management device 202/300 may operate at block 408 to identify, for each function included in the DAG identified at block 406, one or more processing systems that are configured to perform that function while satisfying the function requirement for that function, as well as a proximate memory system utilized by each of those processing system and a connectivity between that processing system/memory system combination that satisfies the function requirement for that function. Furthermore, the resource management engine 304 may then determine a current utilization of each of those processing systems, memory systems, and connectivity and, based on those current utilizations, may determine respective processing system/memory system/connectivity combinations for performing each function included in the DAG that was identified for performing the workload requested at block 404.

As will be appreciated by one of skill in the art in possession of the present disclosure, different processing systems/memory systems/connectivity combinations may provide different function performance capabilities, and at block 408 the resource management engine 304 may compare different function performance capabilities of different processing systems/memory systems/connectivity combinations to identify which of those function performance capabilities best satisfies the function requirement of a function in order to identify the processing systems/memory systems/connectivity combination for performing that function. As such, processing system/memory system/connectivity combinations may each be modeled as a "function performance capability" based on its capability to process data, store data, transfer data, and/or otherwise perform a function. For example, the function performance capability of different processing system/memory system/connectivity combinations may identify data transfer characteristics between the processing system and the memory system included in those processing system/memory system/connectivity combinations that are based on the connectivity included in those processing system/memory system/connectivity combinations, and thus the identification of a processing system/memory system/connectivity combination for performing a function may include identifying a processing system/memory system/connectivity combination with a data transfer characteristic that satisfies a function requirement for the function (e.g., with those data transfer characteristics providing for more efficient (e.g., higher speed) data transfers relative to the data transfer characteristics of the other processing system/memory system/connectivity combinations that are capable of performing that function).

The method 400 then proceeds to block 410 where the resource management device configures the respective processing system/memory system/connectivity combinations to perform each function. With reference to FIGS. 8A and 8B, in an embodiment of block 410, the resource management engine 304 in the resource management device 202/300 may perform function configuration operations 800 that may include configuring the processing systems 208, memory systems 210, and in some cases the networking systems 206 that provide their connectivity, to perform each function included in the DAG identified at block 406. Furthermore, in some embodiments, the function configuration operations 800 that may include configuring the storage systems 212 for use in performing any of the functions included in the DAG identified at block 406 as well (if needed). As will be appreciated by one of skill in the art in possession of the present disclosure, the configuration of the processing systems 208, the memory systems 210, and in some cases the storage system 212 and/or networking systems 206, may include configuring those processing systems 208, memory systems 210, and in some cases storage system 212 and/or networking systems 206, with the parameters included in the DAG blueprint for the DAG identified at block 406 (which are referred to as "initial" parameters in some of the examples provided below). In some examples, the configuration at block 410 may include "pruning" the DAG (e.g., modifying or even removing some functions in that DAG) based on constraints of the processing systems 208, memory systems 210, and/or connectivity of those processing systems and memory systems.

In an embodiment of block 410, the resource management engine 304 in the resource management device 202/300 may map, for each function included in the DAG identified at block 406, the respective memory system determined for that function to the respective processing system determined for that function (e.g., by mapping a memory region provided by that memory system to memory address space used by that processing system) in order to configure the connectivity between that processing system and memory system determined for that function. In a specific example, a first processing system that performs a first function included in in the DAG may be mapped to a memory system that is configured to receive the output of that first function and provide it as an input to a second function included in the DAG. Furthermore, "intermediate" processing systems that perform "intermediate" functions (e.g., between a first function and a last function) included in the DAG may be mapped to memory systems that are configured to receive the output of a "previous" function included in the DAG and provide it as an input to a "current" function included in the DAG. Further still, a last processing system that performs a last function included in the DAG may be mapped to a memory system that is configured to receive the output of a last "intermediate" function included in the DAG and provide it as an input to the last function.

As such, one of skill in the art in possession of the present disclosure will appreciate how the resource management engine 304 in the resource management device 202/300 may generate a resource pipeline of processing system/memory system/connectivity combinations that may each provide optimized performance of a respective function in a DAG that was identified for performing the workload requested at block 404, as well as optimized data transfers between those functions to optimize the performance of the plurality of workload operations that provide the workload. Following the configuration of the processing system/memory system/connectivity combinations, those processing system/memory system/connectivity combinations may perform each of the functions included in the DAG identified at block 406 based on the "initial" parameters from the DAG blueprint in that DAG that were used to configure those processing system/memory system/connectivity combinations.

The method 400 then proceeds to decision block 412 where it is determined whether function modifications have been identified. In an embodiment, at decision block 412 and during the performance of the functions included in the DAG identified at block 406 by processing system/memory system/connectivity combinations configured to perform those functions, the resource management engine 304 in the resource management device 202/300 may perform function performance monitoring operations 900 that may include monitoring the performance of the functions by the processing system/memory system/connectivity combinations configured to perform those functions. As will be appreciated by one of skill in the art in possession of the present disclosure, the monitoring at decision block 412 may be used to identify patterns in the performance of the functions by the processing system/memory system/connectivity combinations configured to perform those functions, which may include identifying data migrations, data usage patterns, data "gravity" points, resource constraints, bottlenecks, and/or any other performance metrics associated with the performance of the functions by the processing system/memory system/connectivity combinations configured to perform those functions.

As such, at decision block 412, the resource management engine 304 in the resource management device 202/300 may determine one or more function modifications for addressing any of the issues identified during the monitoring at decision block 412, which may include adjustments to the parameters in the DAG blueprint of the DAG that includes the functions being performed in order to modify that DAG (e.g., the functions and/or their performance) in order to address and/or to optimize the identified data migrations, optimize the identified data usage patterns, address the identified data "gravity" points, remedy the identified resource constraints, remedy the identified bottlenecks, and/or address any of the other issues identified with the performance of the workload during the monitoring of that workload.

For example, the function modification determination at decision block 412 may include determining that the performance of the functions included in the DAG by the processing system/memory system/connectivity combinations does not satisfy a workload performance threshold of the workload requested at block 404, and then determining the function modification(s) for at least one of those functions that causes the performance of the functions included in the DAG by the processing system/memory system/connectivity combinations to satisfy the workload performance threshold. As discussed below, parameters in the DAG blueprint 700a of the DAG 700 may then be modified to cause the performance of the functions included in the DAG 700 by the processing system/memory system/connectivity combinations to satisfy the workload performance threshold.

If, at decision block 412, it is determined that no function modifications have been identified, the method 400 returns to block 404. As such, the method 400 may loop such that the resource management device receives requests to perform workloads, identifies DAGs for performing those workloads, and deploys those DAGs on processing system/memory system/connectivity combinations as along as no function modifications to any of those DAGs are identified. As such, as long as the DAGs used to perform workloads perform those workloads as desired (e.g., without issues resulting in a determination of function modifications to functions included in those DAGs), those DAGs will continue to be used to perform those and similar workloads.

Figure 10A:
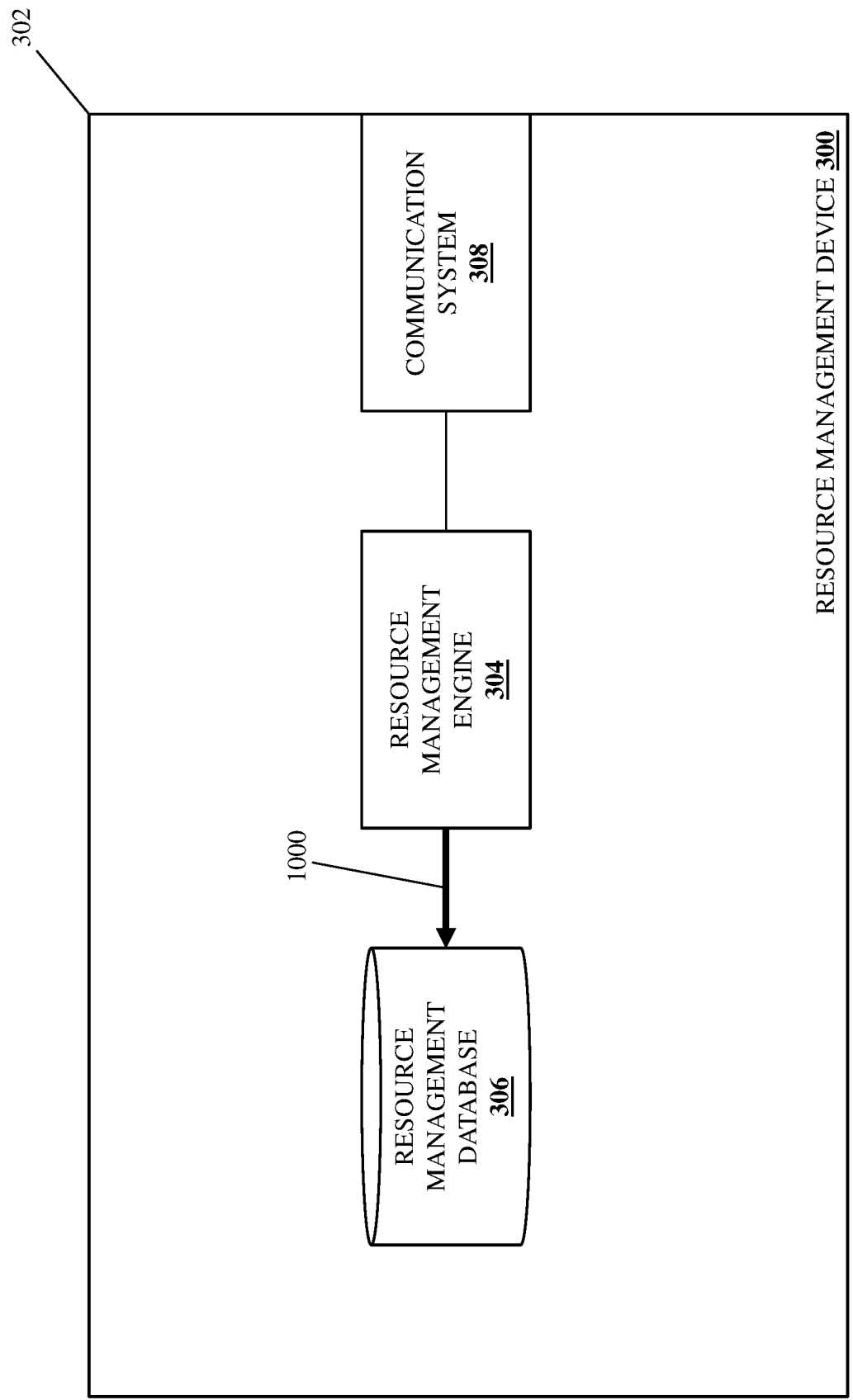
FIG. 10A is a schematic view illustrating an embodiment of the resource management device of FIG. 3 operating during the method of FIG. 4.
Figure 10B:
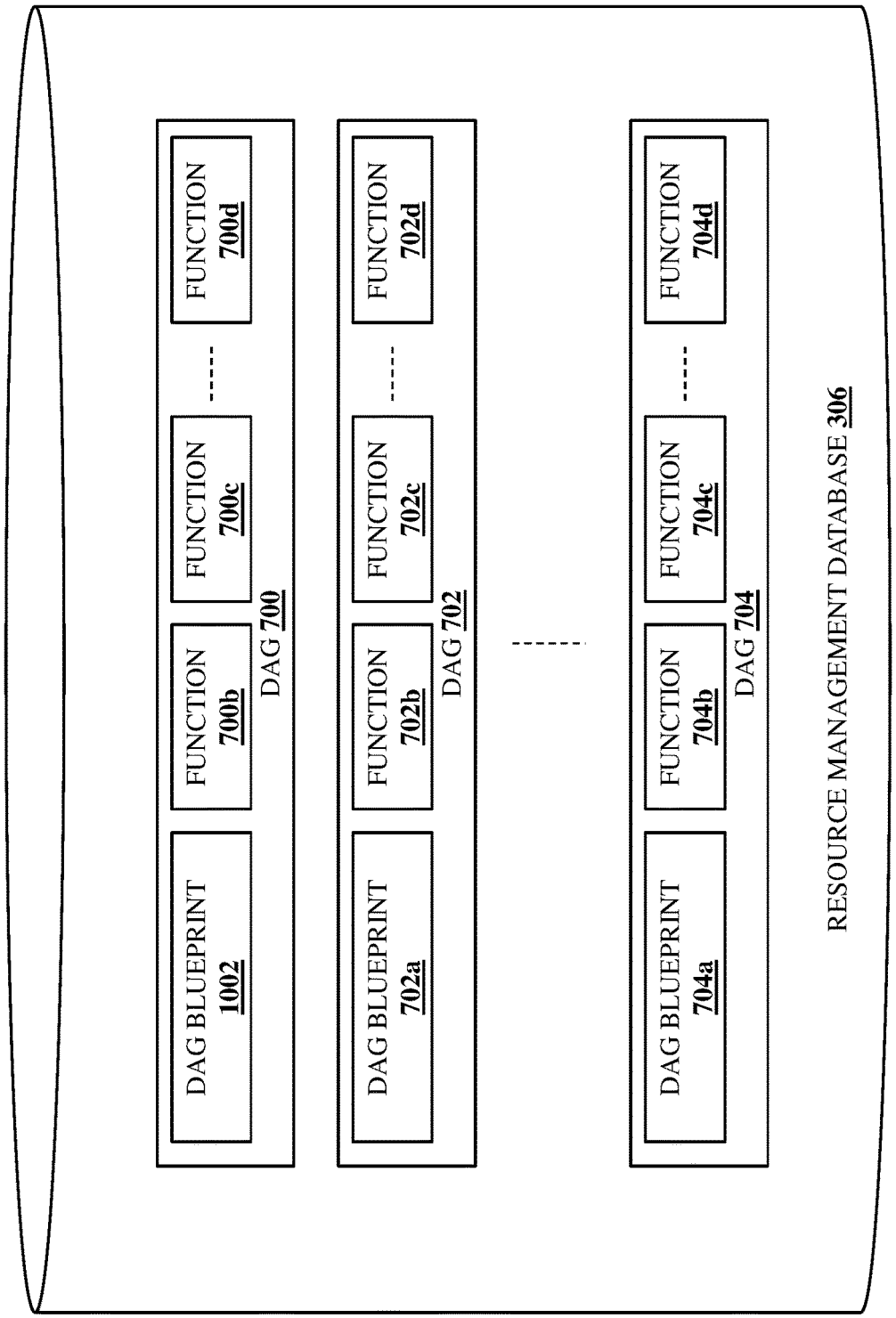
FIG. 10B is a schematic view illustrating an embodiment of the modification of a DAG during the method of FIG. 4.

If at decision block 412, it is determined that function modifications have been identified, the method 400 proceeds to block 414 where the resource management device modifies parameters in the DAG. With reference to FIGS. 10A and 10B, in an embodiment of block 414 and in response to determining function modification(s) have been identified at decision block 412, the resource management engine 304 in the resource management device 202/300 may perform DAG modification operations 1000 that, in the illustrated example, includes modifying the DAG 700 to replace the DAG blueprint 700a with a DAG blueprint 1002 that may include modified parameters relative to the parameters included in the DAG blueprint 700a. For example, the modification of the DAG 700 may include annotating DAG blueprint 700a of the DAG 700 (e.g., as metadata) to provide the DAG blueprint 1002 that allows the modified parameters to be utilized when the DAG 700 is used to perform particular subsequent workloads and/or with different fabrics/topologies, and thus a DAG may include different parameters for use with different workloads and/or in different fabrics/topologies. However, while a specific example of the modification of a DAG blueprint in a DAG has been illustrated and described, one of skill in the art in possession of the present disclosure will appreciate how any part of a DAG (e.g., the functions, etc.) may be modified at block 414 while remaining within the scope of the present disclosure as well.

In a specific example, the modified parameters provided in the DAG blueprint 1000 of the DAG 700 to cause the performance of the functions included in the DAG 700 by the processing system/memory system/connectivity combinations to satisfy the workload performance threshold may provide for the storage of data utilized in at least one of the functions included in the DAG 700 in a different storage location than is provided for by the initial parameters provided in the DAG blueprint 700a of the DAG 700. In another specific example, the modified parameters provided in the DAG blueprint 1000 of the DAG 700 to cause the performance of the functions included in the DAG 700 by the processing system/memory system/connectivity combinations to satisfy the workload performance threshold may include providing for the use of a processing system type for performing at least one of the functions included in the DAG 700 that is different than provided for by the parameters provided in the DAG blueprint 700a of the DAG 700.

In another specific example, the modified parameters provided in the DAG blueprint 1000 of the DAG 700 to cause the performance of the functions included in the DAG 700 by the processing system/memory system/connectivity combinations to satisfy the workload performance threshold may include providing for the use of a memory system type for performing at least one of the functions included in the DAG 700 that is different than provided for by the parameters provided in the DAG blueprint 700a of the DAG 700. In another specific example, the modified parameters provided in the DAG blueprint 1000 of the DAG 700 to cause the performance of the functions included in the DAG 700 by the processing system/memory system/connectivity combinations to satisfy the workload performance threshold may include providing for the use of a processing system/memory system connectivity for performing at least one of the functions included in the DAG 700 that is different than provided for by the parameters provided in the DAG blueprint 700a of the DAG 700.

The method 400 then returns to block 404. As such, the method 400 may loop such that the DAG 700 may be identified for performing a workload requested at block 404 during a subsequent iteration of the method 400 (e.g., the same workload discussed above as being requested during a first iteration of the method 400, a different workload than the workload discussed above as being requested during the first iteration of the method 400, etc.), with the processing system/memory system/connectivity combinations determined to perform the functions 700b-700d configured with the modified parameters included in the DAG blueprint 1000. As such, the performance of workloads based on the capabilities and connectivity of resources may be improved via the monitoring of that performance and modification of the DAGs used to provide for that performance.

Thus, systems and methods have been described that provide for performance of workloads based on the capabilities and connectivity of resources, as well as the improvement of such workload performance. For example, the resource-capability-and-connectivity-based workload performance system of the present disclosure may include a resource management system that is coupled to a plurality of processing systems and a plurality of memory systems. The resource management system determines resource capabilities provided by each of the plurality of processing systems, each of the plurality of memory systems, and connectivity between the plurality of processing systems and the plurality of memory systems. When the resource management system receives a workload request to perform a first workload, it identifies a first Directed Acyclic Graph (DAG) that includes a plurality of functions for performing the first workload and, for each of the plurality of functions, determines a processing system/memory system/connectivity combination based on the resource capabilities that provides a function performance capability that satisfies a function requirement for that function, and configures that respective processing system/memory system/connectivity combination to perform that function. As such, the performance of workloads is improved relative to conventional workload performance systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A resource-capability-and-connectivity-based workload performance improvement system, comprising:
a plurality of processing systems;
a plurality of memory systems; and
a resource management device that is coupled to the plurality of processing systems and the plurality of memory systems, wherein the resource management device is configured to:
receive a first workload request to perform a first workload;
identify a first Directed Acyclic Graph (DAG) that includes a plurality of functions for performing the first workload;
configure, using first parameters included in the first DAG, the plurality of processing systems and the plurality of memory subsystems to perform the plurality of functions;
determine, based on performance of the plurality of functions by the plurality of processing systems and the plurality of memory subsystems, at least one function modification for at least one of the plurality of functions;
modify, based on the at least one function modification, the first parameters included in the first DAG to provide modified parameters;
receive a second workload request to perform a second workload;
identify the first DAG that includes the plurality of functions for performing the second workload; and
configure, using the modified parameters included in the first DAG, the plurality of processing systems and the plurality of memory subsystems to perform the plurality of functions.

2. The system of claim 1, wherein the determining the at least one function modification for the at least one of the plurality of functions based on performance of the plurality of functions by the plurality of processing systems and the plurality of memory subsystems includes:
determining that the performance of the plurality of functions by the plurality of processing systems and the plurality of memory subsystems does not satisfy a workload performance threshold; and
determining the at least one function modification for the at least one of the plurality of functions that causes the performance of the plurality of functions by the plurality of processing systems and the plurality of memory subsystems to satisfy the workload performance threshold.

3. The system of claim 1, wherein the modified parameters for the first DAG provide for the storage of data utilized in at least one of the plurality of functions in a different storage location than provided for by the first parameters for the first DAG.

4. The system of claim 1, wherein the modified parameters for the first DAG provide for the use of a processing system type for performing at least one of the plurality of functions that is different than provided for by the first parameters for the first DAG.

5. The system of claim 1, wherein the modified parameters for the first DAG provide for the use of a memory system type for performing at least one of the plurality of functions that is different than provided for by the first parameters for the first DAG.

6. The system of claim 1, wherein the modified parameters for the first DAG provide for the use of a processing system/memory system connectivity for performing at least one of the plurality of functions that is different than provided for by the first parameters for the first DAG.

7. An Information Handling System (IHS), comprising:
a processing system; and
a memory system that is coupled to the processing system and that includes instructions that, when executed by the processing system, cause the processing system to provide a resource management engine that is configured to:
receive a first workload request to perform a first workload;
identify a first Directed Acyclic Graph (DAG) that includes a plurality of functions for performing the first workload;
configure, using first parameters included in the first DAG, a plurality of processing systems and a plurality of memory subsystems to perform the plurality of functions;
determine, based on performance of the plurality of functions by the plurality of processing systems and the plurality of memory subsystems, at least one function modification for at least one of the plurality of functions;
modify, based on the at least one function modification, the first parameters included in the first DAG to provide modified parameters;
receive a second workload request to perform a second workload;
identify the first DAG that includes the plurality of functions for performing the second workload; and
configure, using the modified parameters included in the first DAG, the plurality of processing systems and the plurality of memory subsystems to perform the plurality of functions.

8. The IHS of claim 7, wherein the determining the at least one function modification for the at least one of the plurality of functions based on performance of the plurality of functions by the plurality of processing systems and the plurality of memory subsystems includes:
determining that the performance of the plurality of functions by the plurality of processing systems and the plurality of memory subsystems does not satisfy a workload performance threshold; and
determining the at least one function modification for the at least one of the plurality of functions that causes the performance of the plurality of functions by the plurality of processing systems and the plurality of memory subsystems to satisfy the workload performance threshold.

9. The IHS of claim 7, wherein the modified parameters for the first DAG provide for the storage of data utilized in at least one of the plurality of functions in a different storage location than provided for by the first parameters for the first DAG.

10. The IHS of claim 7, wherein the modified parameters for the first DAG provide for the use of a processing system type for performing at least one of the plurality of functions that is different than provided for by the first parameters for the first DAG.

11. The IHS of claim 7, wherein the modified parameters for the first DAG provide for the use of a memory system type for performing at least one of the plurality of functions that is different than provided for by the first parameters for the first DAG.

12. The IHS of claim 7, wherein the modified parameters for the first DAG provide for the use of a processing system/memory system connectivity for performing at least one of the plurality of functions that is different than provided for by the first parameters for the first DAG.

13. The IHS of claim 7, wherein the second workload is the same workload as the first workload.

14. A method for improving the performance of workloads based on resource capabilities and connectivity, comprising:
receiving, by a resource management device, a first workload request to perform a first workload;
identifying, by the resource management device, a first Directed Acyclic Graph (DAG) that includes a plurality of functions for performing the first workload;
configuring, by the resource management device using first parameters included in the first DAG, a plurality of processing systems and a plurality of memory subsystems to perform the plurality of functions;
determining, by the resource management device based on performance of the plurality of functions by the plurality of processing systems and the plurality of memory subsystems, at least one function modification for at least one of the plurality of functions;
modifying, by the resource management device based on the at least one function modification, the first parameters included in the first DAG to provide modified parameters;
receiving, by the resource management device, a second workload request to perform a second workload;
identifying, by the resource management device, the first DAG that includes the plurality of functions for performing the second workload; and
configuring, by the resource management device using the modified parameters included in the first DAG, the plurality of processing systems and the plurality of memory subsystems to perform the plurality of functions.

15. The method of claim 14, wherein the determining the at least one function modification for the at least one of the plurality of functions based on performance of the plurality of functions by the plurality of processing systems and the plurality of memory subsystems includes:
determining, by the resource management device, that the performance of the plurality of functions by the plurality of processing systems and the plurality of memory subsystems does not satisfy a workload performance threshold; and
determining, by the resource management device, the at least one function modification for the at least one of the plurality of functions that causes the performance of the plurality of functions by the plurality of processing systems and the plurality of memory subsystems to satisfy the workload performance threshold.

16. The method of claim 14, wherein the modified parameters for the first DAG provide for the storage of data utilized in at least one of the plurality of functions in a different storage location than provided for by the first parameters for the first DAG.

17. The method of claim 14, wherein the modified parameters for the first DAG provide for the use of a processing system type for performing at least one of the plurality of functions that is different than provided for by the first parameters for the first DAG.

18. The method of claim 14, wherein the modified parameters for the first DAG provide for the use of a memory system type for performing at least one of the plurality of functions that is different than provided for by the first parameters for the first DAG.

19. The method of claim 14, wherein the modified parameters for the first DAG provide for the use of a processing system/memory system connectivity for performing at least one of the plurality of functions that is different than provided for by the first parameters for the first DAG.

20. The method of claim 14, wherein the second workload is the same workload as the first workload.

* * * * *